Oct. 11, 1949.   W. C. LONG ET AL   2,484,304
METHOD OF DEWAXING OIL AND CONTINUOUS
ROTARY FILTER THEREFOR

Filed March 25, 1947   2 Sheets-Sheet 1

WILLIAM C. LONG
HAROLD O. BUTTON
*INVENTORS*

BY Raymond W. Barclay

ATTORNEY OR AGENT

Oct. 11, 1949.  W. C. LONG ET AL  2,484,304
METHOD OF DEWAXING OIL AND CONTINUOUS
ROTARY FILTER THEREFOR
Filed March 25, 1947  2 Sheets-Sheet 2

WILLIAM C. LONG
HAROLD O. BUTTON
*INVENTORS*

BY Raymond W. Barclay

ATTORNEY OR AGENT

Patented Oct. 11, 1949

2,484,304

UNITED STATES PATENT OFFICE 2,484,304

METHOD OF DEWAXING OIL AND CONTINUOUS ROTARY FILTER THEREFOR

William C. Long, Paulsboro, and Harold O. Button, Pitman, N. J., assignors to Socony-Vacuum Oil Company, Incorporated, New York, N. Y., a corporation of New York Application March 25, 1947, Serial No. 737,154

7 Claims. (Cl. 196—19)

This invention relates to an improvement in the apparatus and operation of continuous rotary filters used in separation of wax from a chilled slurry containing crystallized wax, oil, and a dewaxing solvent.

A solvent dewaxing process for the removal of wax from petroleum fractions comprises the steps of adding a solvent to the waxy oil, chilling the mixture to precipitate wax therefrom and separating the wax from the mixture by filtration.

The particular solvent employed may be a diluent to decrease the viscosity of the oil or a material or mixture of materials in which the oil is substantially completely soluble and the wax substantially completely insoluble at the dewaxing temperature. Embraced within the term solvent are light petroleum hydrocarbons, such as propane and its homologues, alcohols, ketones, aldehydes, toluene, benzene and its homologues, or other appropriate organic liquids. One solvent commonly employed is a mixture of benzene and methyl ethyl ketone.

The operation of the continuous rotary filters normally employed for separation of the precipitated wax may be understood by reference to the drawing attached hereto, showing a type of filter commonly used, one form of which is described in greater detail in U. S. Patent 2,107,664 to W. P. Gee.

Figure 1:
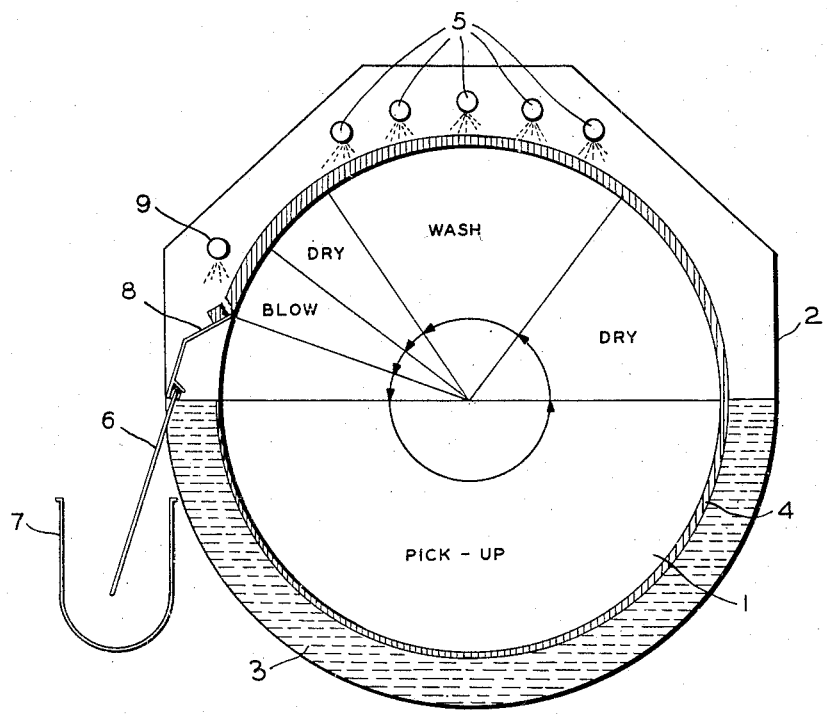
Figure 1 is a diagrammatic view illustrating the filtering cycle of the rotary drum filter.

Referring more particularly to Figure 1, I denotes a rotary filter drum, the cylindrical surface of which is covered with a filtering medium formed from cloth, metal fabric or other suitable porous filtering material. The drum rotates counter-clockwise within a housing 2. The lower portion of the housing is filled with a feed slurry 3, comprising a mixture of precipitated wax, oil, and solvent. As the drum revolves, the filter surface passing through the feed slurry picks up a wax cake, indicated by 4, while the solvent and dissolved oil are forced through the filter surface into the interior of the drum and from there conducted by suitable means to a storage tank. As the wax cake emerges from the slurry, it is subjected to a drying period and is then washed free of oil by a wash solvent applied through sprays 5. After a further drying period, pressure is applied to the cake from within the drum, causing it to lift and break therefrom. The broken cake is then scraped from the drum and led down trough 6 to wax conveyor 7 for further treatment. The sequence of these various operations is indicated by appropriately labeled sections on the drum in the drawing. The arrangement of these operations and their appropriate duration may be varied widely according to the local operating conditions. The wash solvent applied through sprays 5 is generally the same solvent used in dewaxing. In some instances, a wash solvent of different nature than the dewaxing solvent may be employed. Thus, in one form of solvent dewaxing in which liquified propane is used as the dewaxing solvent, it has been found desirable to employ a wash solvent of liquid butane. When the term wash solvent is used herein, all such modifications are contemplated.

Under ideal conditions, the filter operation should be such that substantially all of the oil is drawn during the drying steps by suction through the wax cake into the interior of the drum before the revolving of the rotary filter brings the wax cake to the area where the cake is blown free, scraped and deposited in the wax conveyor. Under actual operating conditions, however, it has been found that a certain amount of oil or mixture of oil and solvent adheres to the under surface of the filtering medium and tends to collect between the actual surface of the drum and the filtering cloth or other medium covering the drum. Under such conditions, this adhering oil is blown out of its place of deposition during the interval when gas pressure is applied to the cake from within the drum, thus causing a certain amount of oil to be blown into the wax cake. This undesirably causes a considerable loss of valuable oil and generally necessitates a re-running of the wax to produce a saleable product.

It is the object of this invention to provide a method of operation wherein the above described apparatus may be run without the undesirable aforementioned feature.

This object is accomplished in accordance with the present invention by the provision of a perforated scraper blade for removing wax from the rotary filter. With the use of such perforated scraper blade in place of the conventional solid scraper blade, it has been found that the wax cake passes over the perforations or holes in the blade but that most of the oil blown out of the filter passes through the holes and back into the filter reservoir instead of into the wax conveyor as has heretofore been the case.

Thus, operation of rotary wax filters in accordance with the present invention is provided by the installation of a perforated scraper blade 8 for removing wax cake from the rotating drum. The removal of oil from the broken-up wax cake as it passes over the perforated scraper blade is further facilitated by the provision of a spray pipe 9 in the space directly above the perforated blade so that a cold solvent spray issuing from said pipe washes the broken wax cake, passes down through the perforations in the scraper blade and back into the reservoir in the filter. The spray from pipe 9 may be either continuous or intermittent and will usually, though not necessarily, be the same solvent employed for washing the wax cake on the drum through sprays 5. The solvent spray from 9, in addition to washing oil from the wax, further serves as a lubricant in preventing the wax from clinging to the scraper blade and particularly to the perforations thereof and in effect serves to wash the wax down the trough into the wax conveyor.

Figure 2:
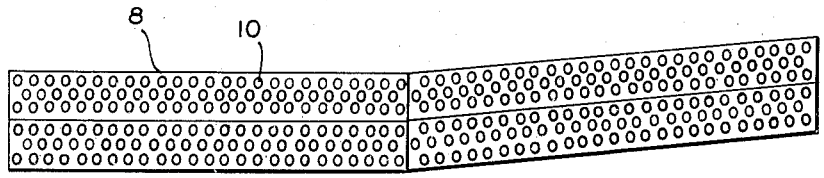
Figure 2 is a detailed view of the perforated scraper blade employed in accordance with the present invention.

The perforated scraper blade used in accordance with the present operation is shown in greater detail in Figure 2. It will be seen that the entire surface of the blade is perforated with small slotted holes 10, of a size sufficient to permit the wax filter cake to pass over the holes but the oil blown out of the filter to pass therethrough. The holes in the scraper blade will generally be located in a vertical position, as the blade is inclined at an angle to the drum to remove wax cake therefrom. The particular degree of inclination of the blade may vary but that portion of the blade in contact with the filter surface will usually be directed at an angle of about 45 degrees to the vertical so that the holes in said blade will ordinarily be located at an angle of about 45 degrees to the direction of flow of the wax cake on said blade.

Figure 3:
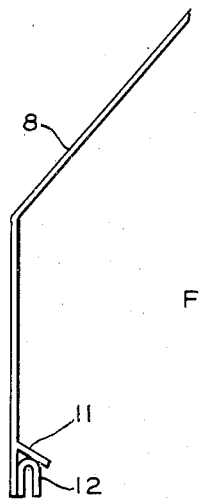
Figure 3 is an end elevational view of the perforated scraper blade used in accordance with the present invention.

Oil and wash solvent passing through the holes of the perforated blade pass for the most part directly back into the reservoir in the filter. A portion of the oil and/or solvent, however, flows down the under side of the blade. It has accordingly been found desirable to provide a deflector plate 11 resting on adapter 12, substantially as shown in Figure 3, whereby oil or solvent flowing down the under side of the blade is prevented from passing down the trough to the wax conveyor but rather is deflected back into the filter reservoir. The adapter 12 serves to interlock the scraper blade with trough 6.

It has been found by the use of the above described perforated scraper blade in dewaxing operations that oil blown into the wax during exposure of the rotating wax cake on filter drum to gas pressure, for the purpose of dislodging the same, can be substantially removed from the wax cake, thereby effecting a substantial saving of dewaxed oil and also eliminating a re-running of the wax to obtain a high grade, substantially oil-free product.

We claim:

1. The method of removing wax from an oily feed slurry in a closed continuous filter, which comprises the steps of forming and washing a wax filter cake upon a travelling surface within the filter chamber, dislodging said cake by blowing gas therethrough, removing said dislodged cake from the filter surface by scraping with a perforated blade, conducting said dislodged cake along the upper surface of said blade, permitting oil contained therein to pass through the perforations of said blade and returning said oil to the initial feed slurry.

2. The method of removing wax from an oily feed slurry in a closed continuous filter, which comprises the steps of forming and washing a wax filter cake upon a travelling surface within the filter chamber, dislodging said cake by blowing gas therethrough, removing said dislodged cake from the filter surface by scraping with a perforated blade, spraying said cake on said blade with a wash solvent, conducting said washed, dislodged cake along the upper surface of said blade, permitting oil washed therefrom, together with said wash solvent, to pass through the perforations of said blade and returning said oil and said wash solvent to the initial feed slurry.

3. The method of operating an enclosed rotary drum filter for removal of oil from wax, wherein a filter cake is formed upon the drum surface while submerged in a feed slurry and washed with solvent after emersion and is then dislodged from the drum surface by blowing gas therethrough, comprising scraping the filter cake so formed with a perforated blade, conducting the dislodged filter cake along the upper surface of said blade, permitting oily liquid contained therein to pass through the perforations of said blade and returning said oily liquid to the initial feed slurry.

4. The method of operating an enclosed rotary drum filter for removal of oil from wax, wherein a filter cake is formed upon the drum surface while submerged in a feed slurry and washed with solvent after emersion and is then dislodged from the drum surface by blowing gas therethrough, comprising scraping the filter cake so formed with a perforated blade, spraying said cake on said blade with a wash solvent, conducting said washed cake along the upper surface of said blade, permitting oily liquid and wash solvent to pass through the perforations of said blade and returning said oily liquid and said wash solvent to the initial feed slurry.

5. Apparatus for continuous dewaxing of a wax-bearing mineral oil, comprising, in combination, a continuous rotary filter including a rotatable filter drum supporting a continuous filtering element, a housing enclosing said drum, means for continuously drying the wax cake on the filtering element, spray devices for continuously washing the cake so dried, means for continuously drying the washed cake, means for dislodging the cake from the filtering element by blowing gas therethrough, and a perforated stationary scraper blade engaging the surface of said drum on one side thereof to remove said dislodged cake from said filtering element.

6. Apparatus for continuous filtration, comprising a drum mounted for rotation about a horizontal axis, a reservoir about the lower portion of said drum to maintain a feed slurry in contact therewith, means to wash and dry a filter cake on the upper surface of said drum and a scraper blade engaging the surface of said drum parallel to the axis thereof on one side, said scraper blade being a rigid sheet having perforations throughout its length to thereby permit liquid to flow from the broken filter cake on said blade back into said reservoir.

7. Apparatus for continuous filtration, comprising a drum mounted for rotation about a horizontal axis, a reservoir about the lower portion of said drum to maintain a feed slurry in contact therewith, means to wash and dry a filter cake on the upper surface of said drum and a stationary scraper blade engaging the surface of said drum at an angle of about 45 degrees to the vertical, said blade being a rigid sheet having perforations throughout its length to thereby permit liquid to flow from the broken filter cake on said blade back into said reservoir.

WILLIAM C. LONG.
HAROLD O. BUTTON.

REFERENCES CITED

The following references are of record in the file of this patent:

UNITED STATES PATENTS

| Number | Name | Date |
| --- | --- | --- |
| 670,247 | Rauch | Mar. 19, 1901 |
| 2,107,664 | Gee | Feb. 8, 1938 |
| 2,115,211 | Overbaugh | Apr. 26, 1938 |
| 2,265,386 | McBerty et al. | Dec. 9, 1941 |
| 2,268,788 | Wanner et al. | Jan. 6, 1942 |